United States Patent [19]
Tsai

[11] Patent Number: 6,061,191
[45] Date of Patent: May 9, 2000

[54] LENS FIXER DEVICE FOR SCANNER

[75] Inventor: Jenn-Tsair Tsai, Hsin-Chu, Taiwan

[73] Assignee: Mustek Systems Inc., Hsinchu, Taiwan

[21] Appl. No.: 09/148,768

[22] Filed: Sep. 5, 1998

[51] Int. Cl.[7] .................................................. G02B 7/02
[52] U.S. Cl. ............................................ 359/819; 359/822
[58] Field of Search .................................... 359/819, 823, 359/822, 811; 385/76–80, 88

[56]  References Cited

U.S. PATENT DOCUMENTS

| | | | |
|---|---|---|---|
| 2,536,124 | 1/1951 | Bolvin et al. ............................ | 401/216 |
| 3,904,277 | 9/1975 | Phillips et al. ....................... | 235/472.03 |
| 5,021,651 | 6/1991 | Ishikawa .................................. | 250/239 |
| 5,146,526 | 9/1992 | Sweeney et al. ......................... | 385/90 |
| 5,278,929 | 1/1994 | Tanisawa et al. ......................... | 385/93 |
| 5,841,591 | 11/1998 | Zhu et al. ................................. | 359/819 |
| 5,884,884 | 3/1999 | Sauter ..................................... | 248/314 |

*Primary Examiner*—Georgia Epps
*Assistant Examiner*—Suzanne Letendre
*Attorney, Agent, or Firm*—W. Wayne Liauh

[57]  ABSTRACT

A lens fixer to be used in a document scanner for easy adjusting and fixing the position of the lens. The lens fixer includes a clamp pedestal and a clamped portion formed as a one-piece element. A room formed by the clamp pedestal and the clamped portion is initially a little smaller for the size of the lens, therefore provides pressure to the lens when the lens is inserted into the room. Three contact lines formed on the notch portion of the clamp pedestal make the lens centering well. The initial pressure prevents the lens from losing the position easily during the adjustment to the correct position.

7 Claims, 4 Drawing Sheets

LENS FIXER DEVICE FOR SCANNER

BACKGROUND OF THE INVENTION

1. Field of the Invention

The present invention relates to a lens fixer device for a scanner, particularly to a one-piece lens fixer device which is easy to adjust and fix the lens to an accurate position.

2. Description of Related Art

Currently, a lens fixer device for a document scanner can be classified as two types:

a) One-piece configuration

As shown in FIG. 1, an axial sectional view of a lens fixer device of prior arts, a lens holder 12 and a lens 10 are both of a cylindrical shape. The lens 10 is inserted into the holder 12 and fixed by three ribs (unshown on FIG. 1) formed on the cylindrical inner surface of the holder 12. The adjustment is performed by the assembly person to align the focused image through the lens 10 right on a CCD (charge couple device) 14 from which a waveform through an oscilloscope can be viewed. Generally, the holder 12 is a one-piece plastic element used for some basic or lower cost models of scanner. For the molding requirement, a departure angle is needed for the holder to depart from its injection mold, that means that the holder 12 is not a true cylinder but with a larger diameter at one end. Also, for the fastening purpose, a shrank portion 16 is formed inside the holder at a suitable position as shown in the figure. The aforesaid non-cylindrical shape of the holder 12 is easy to incline the lens 10 difficulting the same to perform a satisfactory adjustment with the CCD 14. It will then waste much labor and time for the adjustment.

b) Two-piece configuration

As shown in FIG. 2, a cross sectional view of another lens fixer device of prior arts, a lens 10 is fastened on a V-shaped base portion 22 by a separated cover 24 with two screws 26. The V-shaped base portion 22 makes the centering of the lens 10 easy and correct. The base portion 22 and the cover 24 are made of plastic or diecasting metal. They are suitable to be used in higher quality and price scanners. However, upon the adjusting and fastening process, the lens 10 is also easy to slide axially and miss the focus because the V-shaped base portion 22 and the cover 24 are two loose parts. Also, during the adjusting process, the lens moves easily for there is not any extra-pressure on the lens in the beginning. Therefore, a precise adjustment of the lens is still hard to make.

SUMMARY OF THE INVENTION

It is therefore a primary object of the present invention to provide a lens fixer device for scanner which can solve the above problems or disadvantages of prior arts. The lens fixer device will have the advantages of one-piece configuration for a lower cost and of having a triangular room for easy centering of the lens and providing an initial pressure before the final fixing step, and therefore simplifying the adjustment.

A lens fixer device according to the present invention includes a lens clamp which is a one-piece element. The lens clamp has a clamp pedestal and a clamp piece and there is a room for axially holding a cylindrical lens body between the clamp pedestal and the clamp piece. The room of the lens clamp for the lens is initially a little smaller than the diameter of the lens. Since the lens clamp is made of plastic or other similar soft material, this can provide an initial pressure to the lens at the contact portions when the lens is inserted into the lens clamp preventing the lens from sliding during the adjustment and fixing. After adjusting the position of the lens, the lens clamp is further shrank by a screw or other similar fastener element to fix the lens. Besides, there can be further a stopper axially furnished at one of two ends the lens clamp for the lens to stop a point as the starting of the adjustment. In sum, a lens fixer device according to the present invention makes the adjustment of the lens more precise under a pressurized condition, preventing it from sliding easily, and holds the lens by the contact surface of the cylinder and the V-shaped part of the lens fixer with the clamp. Therefore the lens will be easily centered and adjusted.

The features and advantages of the present invention will be described or will become apparent from the following more detailed description of preferred embodiments.

BRIEF DESCRIPTION OF THE DRAWINGS

With reference to the accompanying drawings.

DETAILED DESCRIPTION OF PREFERRED EMBODIMENTS

Conventional lens fixer devices for scanner are described above with reference to FIG. 1 and FIG. 2.

Figure 3:
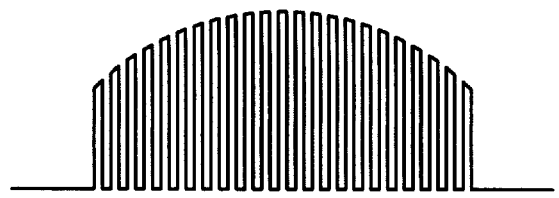
FIG. 3 is a waveform showing on an oscilloscope during an adjustment process when the axes of lens are perpendicular to the CCD.
Figure 4:
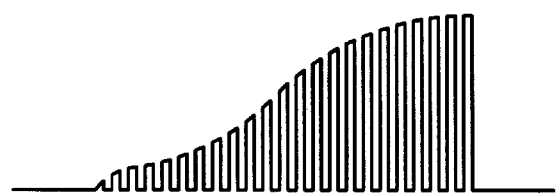
FIG. 4 is a waveform showing on an oscilloscope when the axes of lens are not perpendicular to the CCD and the depth of focus is inclined to the right.
Figure 5:
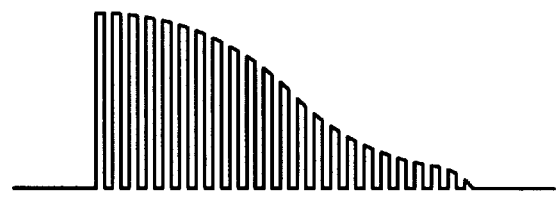
FIG. 5 is a waveform showing on an oscilloscope when the axes of lens are not perpendicular to the CCD and the depth of focus is inclined to the left.
Figure 6:
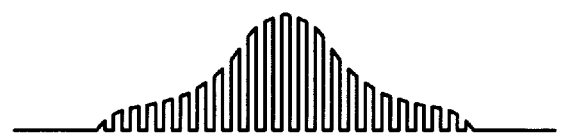
FIG. 6 is a waveform showing on an oscilloscope when the axes of lens are not perpendicular to the CCD and the depth of focus is inclined in the higher middle or the lower middle.

Now referring to FIG. 3, a waveform showing on an oscilloscope during an adjustment process when the axes of lens are perpendicular and focused to the CCD, the waveform is a uniform curve as the lens locates at the right position. It means that all the pixel elements of the CCD are in the depth of focus of the lens. Therefore, the scanned document will be generated into a sharp image on the CCD. On the contrary, if the lens is not at the right position and the axes of the lens are not perpendicular to the CCD, i.e. the lens is inclined in the fixer device, the waveform on an oscilloscope during an adjustment process will be as the one of the following three situations:

a) As shown in FIG. 4, a waveform showing on an oscilloscope when the axes of lens are not perpendicular to the CCD and the depth of focus is inclined to the right side of the image, blurring gradually to the left;

b) As shown in FIG. 5, a waveform showing on an oscilloscope when the axes of lens are not perpendicular to the CCD and the depth of focus is inclined to the left side of the image, blurring gradually to the right; or c) As shown in FIG. 6, a waveform showing on an oscilloscope when the axes of lens are not perpendicular to the CCD and the depth of focus is inclined in the middle of the image, blurring obviously to the left and to the right.

Any of the aforesaid waveforms indicates an inclined lens which has to be adjusted of its axial direction in order to get a whole range and clear image.

Figure 1:
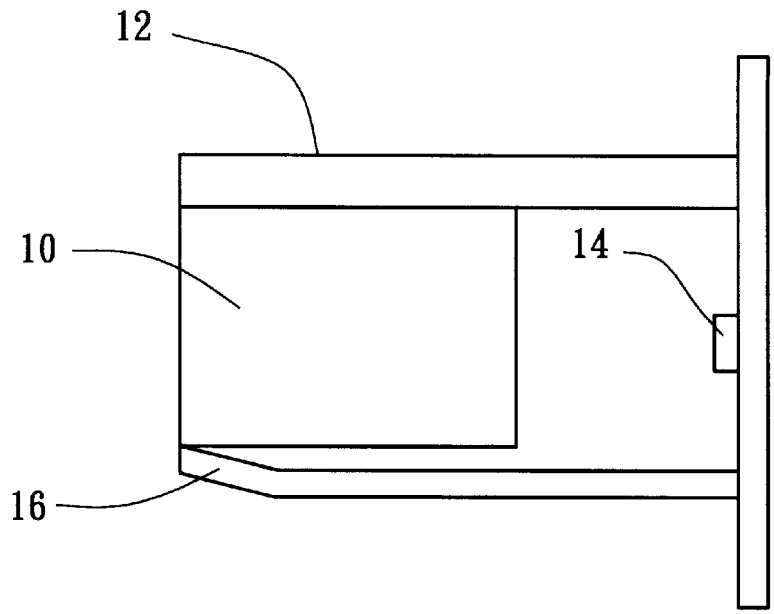
FIG. 1 is an axial sectional view of a conventional lens fixer device for scanner.
Figure 2:
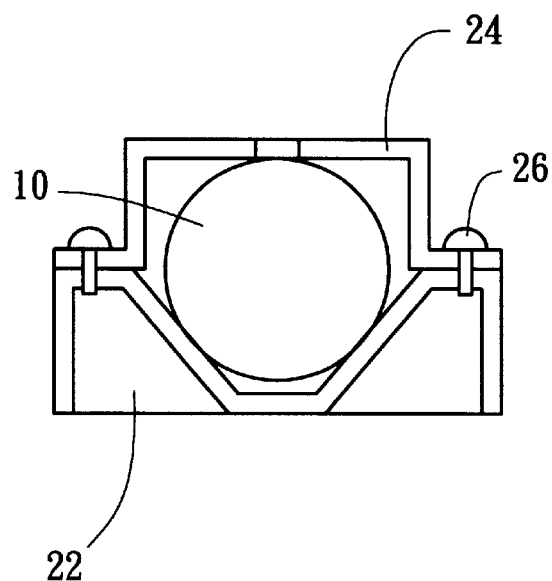
FIG. 2 is a cross sectional view of another conventional lens fixer device for scanner.

The present invention therefore intends to solve the above problem of the inclined lens which happens easily in a one-piece fixer device as shown in FIG. 1. A simplest method is taught as shown in FIG. 2 by using a V-shaped base portion. But the V-shaped base portion of prior arts is made of metal, and a separated cover is needed. They are suitable only for higher price scanners because of their higher cost. The present invention incorporates the advantages of a lower cost of one-piece fixer device and an axial centering of V-shaped base portion, and provides a fixer device with an initial pressure to the lens for making an easier adjustment without losing the position. The lens fixer is a one-piece element with a lower cost and suitable for all kinds of scanner.

Figure 7:
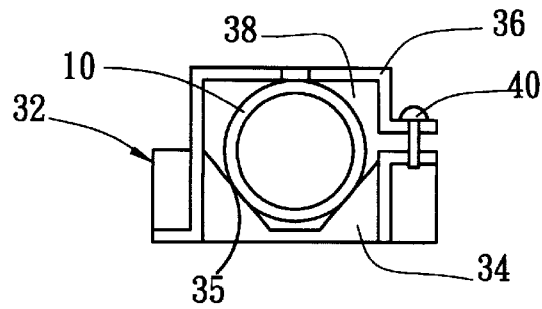
FIG. 7 is a cross sectional view of a lens fixer device for scanner according to the present invention.

As shown in FIG. 7, a cross sectional view of a lens fixer device for scanner according to the present invention, the lens fixer 32 is a one-piece clamp made of plastic for a lower cost. The fixer 32 includes a clamp pedestal 34 and a clamp piece 36. The clamp pedestal 34 has a notch portion 35 of a V-shape or of an arc-shape of a diameter larger than that of the lens 10. A room 38 formed by the clamp pedestal 34 and the clamp 36 is initially a little smaller than the size of the lens 10 that provides pressure to the lens when the cylindrical lens is inserted into the room 38. Three contact lines formed on the planes of the notch portion 35 of the clamp piece 36 make the lens 10 centering well. The initial pressure prevents the lens 10 from losing the position easily during the adjustment to the right position. The lens 10 is fastened by a fastener element 40, such as a screw, to fix the clamp piece 36 to the clamp pedestal 34 after the adjustment.

Figure 8:
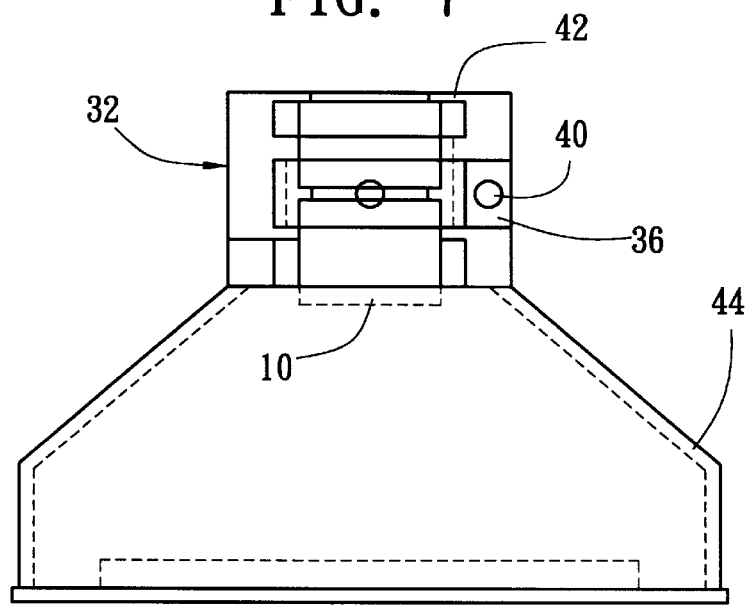
FIG. 8 is a top view of a lens fixer device for scanner according to the present invention in which a stopper is at an outer end.

Further referring to FIG. 8, it is shown a top view of a lens fixer 32 of FIG. 7 in which a stopper 42 is further formed at an outer end far from the opto-electronic module 44. When the lens 10 is inserted into the lens fixer 32 from the inner end, the stopper 42 serves as an initial position for the lens to start the axial adjustment. The stopper 42 provides more convenience to the assembly persons.

Figure 9:
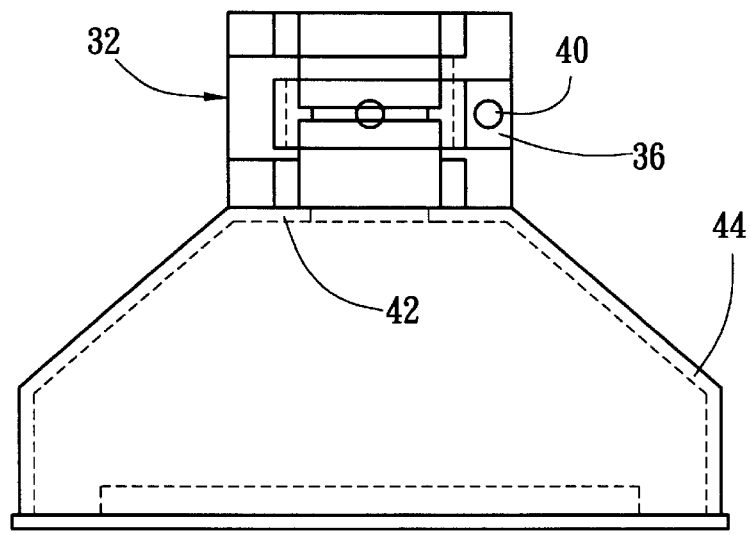
FIG. 9 is a top view of a lens fixer device for scanner according to the present invention in which a stopper is at an inner end.

Further referring to FIG. 9, it is shown a top view of a lens fixer 32 of FIG. 7 in which a stopper 42 is formed at an inner end near the opto-electronic module 44. When the lens 10 is inserted into the fixer 32 from the inner end, the stopper 42 also serves as an initial position for the lens to start the axial adjustment as described in FIG. 8.

Figure 10:
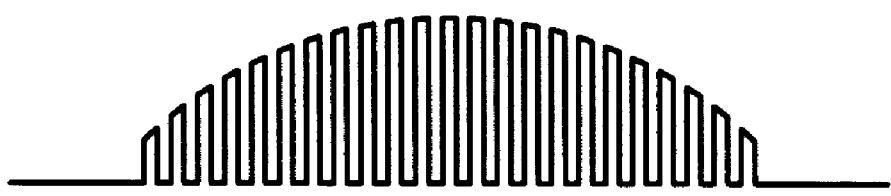
FIG. 10 is a waveform showing on an oscilloscope when the axes of lens are perpendicular to the CCD but out of focus.

In sum, a lens fixer 32 of the present invention is easy to adjust and fix the lens. In FIG. 8, for example, the lens 10 is inserted into the fixer 32 from the inner end near the opto-electronic module 44 till the lens 10 is stopped by the stopper 42. Then, the lens 10 can be moved axially without any inclination as centrally supported by the clamp pedestal 34 and the clamp piece 36. In other words, the axes of lens are always perpendicular to the CCD. The waveform on an oscilloscope when the axial position of the lens 10 is not correctly arranged is shown in FIG. 10. The height of the waveform is shorter than that of the waveform shown in FIG. 3 for a correct position. Since the lens fixer 32 provides an initial pressure to the lens 10, it is easy for us to slightly adjust the lens to its correct position and fix it without losing the position when fastening the fastener element 40 such as screw to the fixer 32.

Although the invention has been described in connection with preferred embodiments, it will be understood by those skilled in the art that various changes may be made without departing from its scope.

What is claimed is:

1. A lens fixer to be used in a document scanner for fixing a lens holder and capable of easily adjusting and fixing a position of said lens holder, said lens fixer comprising:

a lens clamp made of a soft material having a clamp pedestal and a clamp piece integrated with said clamp pedestal as a one-piece, wherein there is a room provided between said clamp pedestal and said claim piece for holding said lens holder, further wherein said room is smaller than said lens holder so that when said lens holder is inserted into said room, said clamp will elastically extend and provide a pressure on said lens holder, so that said lens holder will not skid to facilitate an easy adjustment of said lens holder; and a fastener element for fastening said clamp piece to said clamp pedestal so as to fix said lens holder in said room after said adjustment.

2. A lens fixer for scanner according to claim 1 wherein said room for holding said lens provides an initial pressure to said lens holder before being fastened by said fastener element.

3. A lens fixer for scanner according to claim 1 further comprises a stopper for keeping said lens to an initial position before the adjustment.

4. A lens fixer for scanner according to claim 3 wherein said stopper is formed on one end selectively from two axial ends of said fixer.

5. A lens fixer for scanner according to claim 1 wherein said lens clamp is made of plastic by the injection molding.

6. A lens fixer for scanner according to claim 1 wherein said clamp pedestal has a notch portion formed for receiving said lens holder.

7. A lens fixer for scanner according to claim 1 wherein said fastener element is a screw.

\* \* \* \* \*